UNITED STATES PATENT OFFICE.

FRANZ VON KÜGELGEN, OF HOLCOMBS ROCK, VIRGINIA, AND GEORGE O. SEWARD, OF NEW YORK, N. Y.

CYCLIC PROCESS OF RECOVERING METALLIC TIN.

No. 883,139.  Specification of Letters Patent.  Patented March 24, 1908.

Application filed June 10, 1907. Serial No. 378,294.

*To all whom it may concern:*

Be it known that we, FRANZ VON KÜGELGEN, a subject of the Emperor of Germany, residing at Holcombs Rock, Virginia, and GEORGE O. SEWARD, a citizen of the United States, residing at New York city, New York, have invented certain new and useful Improvements in Cyclic Processes of Recovering Metallic Tin, of which the following is a specification.

This invention relates to the recovery of tin as a metal from materials with which it is associated in the metallic state. Several electrolytic processes have been proposed by which tin is stripped from tin-coated iron scrap (commonly known as "tin scrap") with the formation of hydrous tin chlorids, from which the tin is precipitated by electrolysis.

In some processes the detinning and the subsequent precipitation of the metallic tin are done in the same vessel, using the scrap tin as the anode. In other processes the tin scrap is first treated to remove the coating of tin and the solutions thus formed are electrolyzed in a second step, precipitating the tin in the metallic state. Such electrolytic processes are not continuous, as the solution containing the tin must be removed as soon as the tin is exhausted therefrom and either thrown away or used to treat new quantities of tin scrap. Such exhaustion of the tin is accomplished quickly and the replenishing of the electrolytic tanks must be repeated frequently, making the process an intermittent one. Such processes have also the disadvantage that the tin which is separated when the solution approaches exhaustion is in a very spongy state. Inevitably some iron is brought into solution with the tin and this accumulates, if the liquor is used over again for the detinning, very quickly. This accumulation happens also when the tin scrap is used as the anode and clogs the electrolyte after it has been in use some time.

According to the present cyclic process, the solution and redeposition of the tin are effected in two stages: In the first stage, the tin is removed from the scrap by an anhydrous reagent which is a selective solvent of tin, specifically by dry chlorin, gaseous or in anhydrous solution. In the second stage, the resulting tin compound, specifically anhydrous stannic chlorid, is converted into an electrolyte, as by dissolving it in water, and is decomposed, with insoluble anodes, the anode product being dried and used to treat a second charge of scrap and the pure coherent tin being deposited at the cathode.

In carrying out the process by the use of chlorin the tin scrap or other tin bearing material may be subjected to the action of either dry chlorin gas or a solution of chlorin in an anhydrous liquid, such as stannic chlorid or carbon tetrachlorid, the temperature of the charge being maintained within suitable limits. The tin is thereby converted into stannic chlorid, which is removed from the residual iron and is electrolytically decomposed. The electrolysis is preferably effected by dissolving the stannic chlorid in water and producing two solutions of different concentration, one of specific gravity 1.3, the other of specific gravity 1.15. The solution of higher density is placed in the closed anode compartment of a diaphragm cell and that of lower density is placed in the cathode compartment. The insoluble anodes may be of graphite and the cathodes sheets of pure tin. The cell may contain a series of alternate anode and cathode compartments. Under these conditions and by the use of a current of suitable cathode density, the tin is deposited either as a compact coating or as smooth flexible crystals which can be easily consolidated by moderate pressure into dense coherent masses, suitable for melting. The crystalline deposit should be removed occasionally to prevent its bridging across to the diaphragm. The chlorin is led from the anode compartment, dried, for example by calcium chlorid and sulfuric acid, and returned to the detinning vessels for the treatment of another charge of scrap. It may thus be repeatedly used with little loss. In practice, several detinning vessels may be alternately charged and discharged, chlorin being passed from the electrolytic cell into the vessels containing fresh scrap and stannic chlorid from other vessels being simultaneously supplied to the cell.

The process is especially applicable not only to tin-scrap but to the product containing finely-divided tin obtained by reducing a mixture of tin ore and carbon at a moderate temperature.

We claim:

1. The cyclic process of recovering metallic tin from tin-bearing materials, which consists in treating a charge of the material with an anhydrous selective solvent of tin and producing a tin compound, decomposing said compound into metallic tin and an acid radical, and employing said acid radical to treat another charge of material.

2. The cyclic process of recovering metallic tin from tin-bearing materials, which consists in treating a charge of the material with an anhydrous selective solvent of tin and producing a tin compound, hydrating said compound, decomposing the hydrated compound into metallic tin and an acid radical, drying said acid radical and employing it to treat another charge of material.

3. The cyclic process of recovering metallic tin from tin-bearing materials, which consists in treating a charge of the material with anhydrous chlorin and producing stannic chlorid, hydrating said chlorid, decomposing the hydrated chlorid into metallic tin and chlorin, drying said chlorin and employing it to treat another charge of material.

4. The cyclic process of recovering metallic tin from tin-bearing materials, which consists in treating a charge of the material with an anhydrous selective solvent of tin and producing a tin compound, electrolytically decomposing said compound, and employing the anode product to treat another charge of material.

5. The cyclic process of recovering metallic tin from tin-bearing materials, which consists in treating a charge of the material with an anhydrous selective solvent of tin and producing a tin compound, electrolytically decomposing said compound, and employing the anode product in a dry state to treat another charge of material.

6. The cyclic process of recovering metallic tin from tin-bearing materials, which consists in treating a charge of the material with anhydrous chlorin and producing stannic chlorid, electrolytically decomposing said chlorid, and employing the electrolytic chlorin in a dry state to treat another charge of material.

7. The cyclic process of recovering metallic tin from tin-bearing materials, which consists in treating a charge of the material with an anhydrous selective solvent of tin and producing a tin compound, dissolving said compound in water, electrolyzing the aqueous solution with an insoluble anode, removing and drying the anion and employing it to treat another charge of material.

8. The cyclic process of recovering metallic tin from tin-bearing materials, which consists in treating a charge of the material with anhydrous chlorin and producing stannic chlorid, dissolving said chlorid in water, electrolyzing the aqueous solution with an insoluble anode, removing and drying the electrolytic chlorin and employing it to treat another charge of material.

9. The cyclic process of recovering metallic tin from tin-bearing materials, which consists in treating a charge of the material with anhydrous chlorin and producing stannic chlorid, dissolving said chlorid in water to produce two solutions of different concentration, electrolyzing said solutions by passing an electric current from an insoluble anode successively through the more concentrated and less concentrated solution, removing and drying the electrolytic chlorin and employing it to treat another charge of material.

In testimony whereof, we affix our signatures in presence of witnesses.

FRANZ VON KÜGELGEN.
GEORGE O. SEWARD.

Witnesses as to the signature of Franz von Kügelgen:
 HARRY RILEY LEE,
 J. H. WEBB.

Witnesses as to the signature of George O. Seward:
 JUSTIN C. WALKER,
 GEO. F. SEWARD.